3,329,620
NOVEL PHOSPHORUS SULFIDE PRODUCT AND METHOD FOR ITS MANUFACTURE
John H. Schmadebeck, Lewiston, N.Y., assignor to Hooker Chemical Corporation, Niagara Falls, N.Y., a corporation of New York
No Drawing. Filed Apr. 1, 1963, Ser. No. 269,726
13 Claims. (Cl. 252—182)

This invention relates to a novel phosphorus sulfide composition and a method for its manufacture, and more particularly relates to a novel composition of phosphorus sesquisulfide, including the process whereby this novel composition may be made.

In the manufacture of phosphorus sulfides, it is generally the practice to react molten phosphorus and molten sulfur together in the proportions calculated to yield the desired phosphorus sulfide product. In this method, the phosphorus and sulfur are introduced with agitation into a molten batch of phosphorus sulfide and reacted in proportions calculated to yield the desired product, the heat of reaction being absorbed by the molten batch and transferred thereby to a suitable heat exchanging surface or material. Thus, the proportions of phosphorus and sulfur used are varied, depending upon the particular phosphorus sulfide being produced, e.g., phosphorus pentasulfide ($P_4S_{10}$), phosphorus sesquisulfide ($P_4S_3$), phosphorus heptasulfide ($P_4S_7$), and the like. Although either red phosphorus or white phosphorus may be used in this reaction, from the standpoint of cost, it is generally preferred to use the white phosphorus.

The phosphorus sulfides produced by the above procedure are all, more or less, flammable. Accordingly, considerable care must be exercised in processing these phosphorus sulfides from the molten state in which they are prepared to a more salable form. At a minimum, the precautions which must be taken to avoid spontaneous combustion of the phosphorus sulfide during subsequent cooling, grinding, and packaging must include carrying out these operations in an inert atmosphere, such as nitrogen and/or carbon dioxide. Obviously, even this one precaution adds considerably to the cost and complexity of the process. With phosphorus sesquisulfide, however, even greater care and additional processing steps must be utilized in order to obtain, safely, a product having the desired purity. Because phosphorus sesquisulfide has the highest phosphorus to sulfur ratio of any of the known crystalline phosphorus sulfides, even a small excess of phosphorus over the stoichiometric amount required to form the sesquisulfide generally results in a product containing free phosphorus. Such a product is extremely flammable and difficult to handle. Accordingly, it is generally the practice to utilize a slight excess of sulfur over the stoichiometric amount required in forming the sesquisulfide so as to eliminate any free phosphorus in the product. This, however, results in the formation of higher phosphorus sulfides, such as the heptasulfide and/or pentasulfide, which higher sulfides are impurities and must be removed in order to have a phosphorus sesquisulfide product of salable quality. It is, therefore, generally the practice in making phosphorus sesquisulfide to quench the reacted batch of molten phosphorus sesquisulfide in water to obtain a granular physical form. This cold, wet product is then leached, using water, so as to remove the higher sulfide impurities. Because of the high flammability of the sesquisulfide, the product is ground to a powder while wet and is then dried under vacuum. The dried product is then packaged, utilizing an inert atmosphere because of its flammability.

It will be appreciated that the processes wherein phosphorus sulfides are converted from the molten state to a salable form are complicated procedures involving many steps. Not only is the procedure complex, but, additionally, the many steps involved add appreciably to the cost of the final phosphorus sulfide product. Moreover, the phosphorus sulfides ultimately produced are all, more or less, flammable, thereby presenting a hazard during shipment and ultimate use.

It is, therefore, an object of the present invention to provide a simple and economical process for preparing phosphorus sulfides.

Another object of the present invention is to provide a means of converting molten phosphorus sulfide to a salable solid form wherein the numerous complex and expensive steps heretofore used are eliminated.

A further object of the present invention is to provide a novel phosphorus sulfide composition, which composition is less flammable than those heretofore available, and, hence, less hazardous to handle.

A still further object of the present invention is to provide an improved process whereby the improved novel phosphorus sulfide composition may be prepared.

These and other objects will become apparent to those skilled in the art from the description of the invention which follows.

In the practice of the method of the present invention, a phosphorus sulfide at an elevated temperature is quenched in a saturated aliphatic oil to form an oil slurry of the phosphorus sulfide. Thereafter, an oil-wet phosphorus sulfide product is recovered from the slurry. This product has an appreciably higher auto-ignition temperature than does the prior art phosphorus sulfide and, additionally, does not dust, thus reducing to zero the possibility of dust explosions.

More specifically, in the practice of the present method, the phosphorus sulfide to be treated is generally at an elevated temperature appreciably above room temperature, i.e., about 20 degrees centigrade, for example, above about 100 degrees centigrade, and is preferably at a sufficiently high temperature as to maintain it in the molten state. The specific temperatures required to maintain the phosphorus sulfide in the molten state will, of course, vary depending upon which phosphorus sulfide is being treated. If the phosphorus sulfide is phosphorus sesquisulfide ($P_4S_3$), for example, it will preferably be at a temperature above about 200 degrees centigrade, e.g., about 350 degrees centigrade, but may also be higher, even up to 500 degrees centigrade or more in some instances at the time of treatment. In this regard, it is to be noted that although various phosphorus sulfides can be treated in accordance with the present method, such as phosphorus pentasulfide, phosphorus heptasulfide, phosphorus sesquisulfide, and the like, the method has been found to be particularly suitable for treating phosphorus sesquisulfide and for this reason, primary reference will be made hereinafter to this material. This is not, however, to be taken as a limitation on the method of the present invention but merely as being exemplary of this method.

The molten phosphorus sesquisulfide may be produced in any convenient manner, although generally, it is prepared by introducing phosphorus and sulfur into a molten batch or "heel" of phosphorus sesquisulfide wherein they are reacted in a proportion calculated to yield phosphorus sesquisulfide. The thus-obtained molten phosphorus sesquisulfide, at a temperature of about 350 degrees centigrade, is then quenched in a quantity of a saturated aliphatic oil.

Any convenient method of effecting quenching of the phosphorus sesquisulfide in the oil may be used. Inasmuch as the manner in which the quenching is effected generally has some effect on the physical form of the final phosphorus sesquisulfide product, the physical form in which the final product is desired must be taken into consideration in choosing a quenching method. Frequently, it is preferred that the phosphorus sesquisulfide product be in a particulate or finely divided form, e.g., from about 50 microns to 2 millimeters but larger particles, about 2 millimeters to 10 millimeters may be desirable in some applications. To obtain a fine product, it is preferred that quenching of the molten phosphorus sulfide be effected by spraying the phosphorus sesquisulfide underneath the surface of the quenching oil. Variations in the particle size of the phosphorus sesquisulfide may then be obtained by varying the openings in the nozzle through which the phosphorus sesquisulfide is sprayed and/or by using different types of nozzles, as will be apparent to those skilled in the art. Where the particle size of the phosphorus sesquisulfide product is not of major importance, the quenching may be accomplished by adding the entire batch or mass of molten phosphorus sesquisulfide to the body of the quenching oil and effecting agitation of the oil so as to break up the phosphorus sesquisulfide into more discrete particles. Generally, it is preferred that the molten phosphorus sesquisulfide be conducted beneath the surface of the quenching oil so that subsurface contact with the oil is effected, thus preventing contact with air and possible spontaneous combustion. In this manner, the need for maintaining the phosphorus sesquisulfide in an inert atmosphere during cooling, as required by the prior art processes, can be eliminated. It is to be appreciated, however, that the method of the present invention is also applicable where the molten phosphorus sesquisulfide is passed through an inert atmosphere before coming into contact with the quenching oil. Obviously, because of the added cost involved in such a process to provide such an inert atmosphere, this is not the most preferred method of practicing the present invention.

The quenching oil to which the molten phosphorus sesquisulfide is added, preferably by spraying beneath the oil surface, is generally maintained in a tank or similar container. In this manner, subsurface contact between the molten phosphorus sesquisulfide and the oil is more easily effected. It will be appreciated, of course, that means other than in a tank or similar container may be used. For example, a falling film of the quenching oil may be formed, using apparatus similar to falling film type absorbers, and the molten phosphorus sesquisulfide brought into contact with the film of quenching oil. Such alternate methods, however, generally involve the use of more complicated and expensive apparatus so that the quenching oil is, preferably, maintained in a tank or similar container and the molten phosphorus sesquisulfide is quenched by spraying it beneath the surface of the oil in the tank.

In the practice of the method of the present invention, it has been found that it may be preferable to agitate or mix the quenching oil in the tank as the molten phosphorus sesquisulfide is dispersed therein. In this manner, there is a more rapid dissipation of the heat of the phosphorus sesquisulfide and a more uniform dispersion of the sesquisulfide product in the oil is obtained. As has been indicated hereinabove, this agitation of the quenching oil is particularly desirable where the entire batch of molten phosphorus sesquisulfide is added to the quenching oil at one time. It has also been found, however, that advantageous results are obtained, in terms of the heat dissipation and dispersion of the phosphorus sesquisulfide, where agitation of the quench oil is utilized, regardless of the manner in which the molten phosphorus sesquisulfide is added to the oil. Accordingly, in the most preferred operation of the present invention, the quenching oil will be agitated.

It will be appreciated that the amount of the quenching oil used will be at least that amount which is required to effect cooling of the hot phosphorus sesquisulfide to a temperature at which the resulting phosphorus sesquisulfide composition can be readily handled for further processing and shipping. Generally, this temperature will be about room temperature, i.e., about 20 degrees centigrade. In actual practice, it is preferred that the temperature of the slurry of phosphorus sesquisulfide in oil be reduced to a temperature somewhat below room temperature, e.g., 5 to 10 degrees below room temperature. It has been found that when the slurry of sesquisulfide in oil is obtained at room temperature or slightly above, there is a settling out of the sesquisulfide from the slurry during subsequent processing, as the temperature is gradually reduced to about room temperature. This settling out is, however, overcome where the slurry is initially obtained at a temperature below room temperature and the temperature is permitted to rise to about room temperature during processing.

The exact amounts of quenching oil will, of course, vary in each instance, depending upon the cooling capacity of the particular oil used, the temperature of the phosphorus sesquisulfide, the amount of agitation of the quenching oil, as well as the particle size of the sesquisulfide in the oil. Exemplary of amounts of quenching oil which may be satisfactorily used is an amount having a weight ratio to the phosphorus sesquisulfide being treated within the range of about 3 to about 7:1. While there is no limit on the maximum amount of quenching oil which may be used, other than a practical one, it will be appreciated that large excesses of quenching oil generally will not be used because of the extra time and work involved in handling large quantities of oil during the subsequent processing of the phosphorus sesquisulfide-oil slurry to obtain the desired phosphorus sesquisulfide composition. It will be appreciated, however, that in addition to the above factors which affect the amount of quenching oil required, lesser amounts of quenching oil than would ordinarily be needed may be used where the oil itself is cooled in some manner. This may be accomplished by passing the oil itself through cooling equipment before it is introduced into the tank or similar container; by providing cooling coils either within or around the outside of the tank or container; or by other means well known to those in the art.

The saturated aliphatic oil used for quenching in the present method may be any saturated aliphatic petroleum, mineral, or hydrocarbon oil which is substantially non-reactive with the phosphorus sulfide under the conditions of the present method. The oil used may have either a straight or branched chain and is, preferably, unsubstituted, although, where desirable, it may have substituents which are non-reactive with the phosphorus sulfide, e.g., halogens such as chlorine. The oil used should be free of water, aromatics, or other unsubstitution, as well as other substituents and impurities which would be reactive with the phosphorus sulfide. Exemplary of oils which may be used in the present method are the aliphatic lubricating oils of about 20 to 34 carbon atoms (motor oils) and any 100 second @ 100° F. aliphatic oil or oils in this range that are substantially paraffinic based.

After the phophorus sesquisulfide has been dispersed in the quenching oil and the resulting oil slurry of sesquisulfide has attained the desired temperature, separation of a substantial portion of the oil and phosphorus sesquisulfide is effected. This separation may be carried out in any desired manner, as for example by filtration, centrifuging, or the like. It will be appreciated that the extent to which the filtration or other separation is carried will determine the oil content of the final sesquisulfide product. Generally, it is preferred that the separation be carried out so that the final phosphorus sesquisulfide product has an oil content within the range of about 5 to about 50 percent by weight. For many uses, it has been found that a phosphorus sesquisulfide product having a $P_4S_3$ content within the range of about 85 to about 95 percent by weight and an oil content within the range of about 5 to about 15 percent by weight is particularly desirable and in these instances, such a product may be specifically preferred. The filtration, centrifuging, or other separation techniques for obtaining the desired phosphorus sesquisulfide product may be carried out using any of the conventional apparatus, as is well known in the art, for such separation techniques. In many instances, it has been found that a sesquisulfide product having a more nearly uniform oil content can be produced by using centrifuging methods for obtaining separation of the product and for this reason, this technique may be preferred.

The phosphorus sesquisulfide product produced by the method of the present invention is found to be particularly suited for the manufacture of phosphorus-containing gasoline additives, which additives are useful as pre-ignition inhibitors and aid to prevent spark plug fouling. In such uses, the phosphorus sesquisulfide product of the present invention is reacted with some other organic material which acts to tie up the sulfur of the phosphorus sesquisulfide so as to prevent corrosion of engine parts. The phosphorus sesquisulfide product of the present invention is found to be particularly advantageous in that it is non-dusting and has an appreciably higher auto-ignition temperature than does the dry phosphorus sesquisulfide product obtained by the methods of the prior art, it may be 5 degrees centigrade to as much as 30 degrees centigrade or more higher, e.g., 20 degrees centigrade higher. This product is, therefore, safer to handle and the possibility of dust explosions is reduced to substantially zero. It is to be noted that in the practice of the method of the present invention, a phosphorus sesquisulfide product of acceptable purity is obtained without distillation of the crude $P_4S_3$ before quenching. It will be appreciated, however, that if it is desired to obtain a phosphorus sesquisulfide having an exceptionally high purity, distillation of the crude phosphorus sesquisulfide may be effected. In such instances, the molten crude phosphorus sesquisulfide will be distilled and the condensate from the distillation will be dispersed beneath the surface of the quenching oil, in the same manner as when the present process is carried out without distillation of the crude phosphorus sesquisulfide.

In order that those skilled in the art may better understand the present invention and the manner in which it may be carried out, the following specific examples are given. In these examples, unless otherwise indicated, the temperatures are in degrees centigrade and the percentages and parts are by weight.

*Example 1*

1200 parts of phosphorus sesquisulfide ($P_4S_3$), having an auto-ignition temperature of 50° C., was placed in a distillation flask fitted with an air cooled condenser. The $P_4S_3$ was distilled under vacuum for a period of about 3 hours. The distillation temperature was within the range of about 200 to 240° C. and the pressure was within the range of about 1 to about 20 mm. of Hg. The vapors of $P_4S_3$ were condensed in the air cooled condenser and the liquid $P_4S_3$ condensate was run into a receiver containing about 5000 parts of a 100 second @ 100° F. aliphatic paraffinic based oil. Sufficient heat was applied to the condenser and the walls of the receiver, above the oil level, to prevent solidification of the $P_4S_3$ liquid condensate. The liquid $P_4S_3$ was run down the wall of the receiver into the oil. A total of 1146 parts of purified $P_4S_3$ was collected in the oil. This oil slurry of $P_4S_3$ was then filtered to separate the major proportion of the oil. The resulting product contained 85 percent $P_4S_3$ and 15 percent oil and had an auto-ignition temperature of 102° C. Analysis of this product showed a phosphorus content of 40.9 percent and 0.9 percent of carbon disulfide insolubles.

*Example 2*

The procedure of Example 1 was repeated with the exception that the vapors of $P_4S_3$ from the distillation were condensed in a falling film of oil. The oil film was formed by flowing the oil down the sidewalls of a T. The $P_4S_3$ vapors were introduced through the side arm of the T and the resulting oil slurry of $P_4S_3$ was collected in a receiver. The oil used in this example was a 100 second @ 100° F. aliphatic paraffinic based oil designated by the manufacturer, the Mobil Oil Co., as Thermiex 907. The major portion of the oil was separated from the slurry as in Example 1 and the resulting product contained about 81 percent $P_4S_3$ and 19 percent oil.

*Example 3*

88 parts of phosphorus sesquisulfide was heated at 275 degrees centigrade for about 20 minutes, until all of the $P_4S_3$ was in the liquid state. The liquid $P_4S_3$ was then added to 500 parts of the oil used in Example 1, maintained under a $CO_2$ atmosphere, in a receiving vessel. The initial temperature of the oil was about 27 degrees centigrade and the final oil temperature, after the addition of the $P_4S_3$ was about 30 degrees centigrade. The major amount of the oil was separated from the thus-formed oil slurry as in Example 1 and the resulting product contained about 88 percent $P_4S_3$ and about 12 percent oil.

All the products of these examples are stable at room temperature. They have high auto-ignition temperatures and are therein highly superior to ordinary phosphorus sesquisulfides of commerce. They are also dust free and because of the safety of the invented products, are even more useful in many applications for which ordinary phosphorus is usually employed. They are especially satisfactory in the formulation of gasoline additives.

*Example 4*

To a heated reaction vessel, equipped with a stirrer, there were incrementally added, under nitrogen, 397 lbs. of sulfur and 512 lbs. of phosphorus, the amounts required to make 909 lbs. of phosphorus sesquisulfide, $P_4S_3$. The reaction vessel was held at a temperature between 200° C., and 400° C. for 10 hours, after the initial reaction at a temperature within the same range. The molten product was then blown to a stirred quench tank containing about 300 gallons of saturated hydrocarbon quenching oil. The $P_4S_3$ was sprayed beneath the oil surface through a nozzle having ⅛″ openings. The heat of the sesquisulfide, which is initially at about 250° C., raised the oil temperature from room temperature to about 60° C. and the slurry formed, with mixing, after the subsurface addition of the $P_4S_3$ to the oil, contained 43 percent $P_4S_3$, by weight, the $P_4S_3$ being in finely divided form, as described elsewhere in this specification.

The slurry was pumped to a filtering tank having a filtering medium on the bottom thereof. A vacuum of 20 inches of mercury was applied to the tank bottom and thereby excess oil was removed from the slurry. After an hour the $P_4S_3$ coated with oil had been "dried" to an oil content of 12–18 percent as shown by subsequent analysis. The oil removed, plus makeup required, was subsequently recycled to the quench tank.

In a similar procedure, the excess oil is removed by centrifuging, instead of filtering; this produced a product which was 92 percent $P_4S_3$ with only 7–8 percent oil present.

The product made, as described above, is packed in drums and may be shipped with much greater safety than $P_4S_3$. In air, its autoignition temperature is is over 100° C., compared to about 45° C. for $P_4S_3$. Thus, it is considerably less hazardous.

The coated particles are of size within the range of 50 microns to 10 millimeters, usually being less than 2 millimeters in diameter. They are useful for making preignition inhibitors for gasoline, without the necessity for removing the oil from the particles before effecting the reaction. They also are dust-free and easy to handle and transport.

From the above examples, it is clearly seen that by the method of the present invention a novel phosphorus sulfide composition is produced which composition is substantially dust free and has an appreciably higher auto-ignition temperature than does the phosphorus sulfide produced by the prior art methods. Moreover, it is further seen that by operating in accordance with the present method, the processing difficulties of the molten phosphorus sulfides, in terms of the requirements for operating in an inert atmosphere and for grinding the phosphorus sulfide while water-wet are eliminated. In this manner, a great simplification of the existing processes for preparing phosphorus sulfide is obtained with an appreciable savings in terms of initial capital investment and operating cost.

While there have been described various embodiments of the invention, the compositions and methods described are not intended to be understood as limiting the scope of the invention, as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for making a phosphorus sulfide composition which has a high auto-ignition temperature which comprises contacting a molten phosphorus sulfide with a saturated aliphatic oil and effecting formation of an oil slurry of said phosphorus sulfide.

2. A process for making a phosphorus sulfide composition which has a high auto-ignition temperature which comprises conducting a molten phosphorus sulfide beneath the surface of a body of a saturated aliphatic oil, effecting subsurface contact between the oil and the phosphorus sulfide and forming an oil slurry of the phosphorus sulfide.

3. The process as claimed in claim 2 wherein the molten phosphorus sulfide is dispersed beneath the surface of the body of oil.

4. The process as claimed in claim 3 wherein the dispersion of phosphorus sulfide is effected by spraying the molten phosphorus sulfide beneath the surface of the body of oil.

5. A process for making a phosphorus sulfide which has a high auto-ignition temperature and is substantially dust free which comprises conducting a molten phosphorus sulfide beneath the surface of a body of a saturated aliphatic oil, effecting subsurface contact between the oil and the phosphorus sulfide by dispersing the phosphorus sulfide beneath the oil surface, forming an oil slurry of the phosphorus sulfide and separating a portion of the oil from the slurry.

6. The process as claimed in claim 5 wherein the separation of the oil from the slurry is effected by filtration.

7. The process as calimed in claim 5 wherein the separation of the oil from the slurry is effected by centrifuging.

8. A process for making a phosphorus sesquisulfide composition which has a high auto-ignition temperature and is substantially dust free which comprises reacting phosphorus and sulfur at a temperature above 200° C. in proportions of substantially four parts of phosphorus to three parts of sulfur so as to yield a molten phosphorus sesquisulfide, spraying the resulting molten phosphorus sesquisulfide product under the surface of a body of a saturated aliphatic oil, forming a slurry of the phosphorus sesquisulfide in the oil, and separating a portion of the oil from the resulting slurry.

9. The process as claimed in claim 8 wherein the amount of oil separated from the slurry is such that the resulting product has an oil content within the range of about 5 percent to about 50 percent by weight.

10. The process as claimed in claim 9 wherein the oil content of the resulting product is within the range of about 5 percent to about 15 percent by weight.

11. The process as claimed in claim 8 wherein the phosphorus sesquisulfide resulting from the reaction of the phosphorus and the sulfur is distilled and the resulting condensate of purified phosphorus sesquisulfide is sprayed beneath the oil surface.

12. A phosphorus sesquisulfide composition which has a high auto-ignition temperature and is substantially dust free which consists essentially of from about 50–95% by weight of phosphorus sesquisulfide and about 5–50% by weight of a saturated aliphatic oil.

13. The composition as claimed in claim 12 wherein the phosphorus sesquisulfide is present in an amount within the range of about 85 percent to about 95 percent by weight and the oil is present in an amount within the range of about 5 percent to about 15 percent by weight.

References Cited

UNITED STATES PATENTS 1,153,054   9/1915   Frary _____ 23—206

FOREIGN PATENTS 247,905   7/1912   Germany.

LEON D. ROSDOL, *Primary Examiner.*

DANIEL E. WYMAN, Y. M. HARRIS,
*Assistant Examiners.*